United States Patent [19]

O'Brien et al.

[11] Patent Number: 5,962,630
[45] Date of Patent: Oct. 5, 1999

[54] PROCESS AND MATERIAL THAT ENCAPSULATES SOLID HAZARDOUS WASTE

[75] Inventors: Michael H. O'Brien; Arnold W. Erickson, both of Idaho Falls, Id.

[73] Assignee: The United States of America as represented by the United States Department of Energy, Washington, D.C.

[21] Appl. No.: 08/984,048

[22] Filed: Dec. 3, 1997

[51] Int. Cl.⁶ ..................................................... C08G 75/14
[52] U.S. Cl. .......................... 528/389; 528/381; 524/609; 588/8; 588/255; 252/625
[58] Field of Search ..................................... 528/389, 381; 524/609; 588/8, 255; 252/625

[56] References Cited

U.S. PATENT DOCUMENTS

| | | | |
|---|---|---|---|
| 4,311,826 | 1/1982 | McBee et al. | 528/389 |
| 4,376,830 | 3/1983 | Nimer et al. | 501/106 |
| 5,649,323 | 7/1997 | Kalb et al. | 588/8 |

FOREIGN PATENT DOCUMENTS

| | | |
|---|---|---|
| 2844204 | of 0000 | Germany . |
| 4986420 | 8/1974 | Japan . |

*Primary Examiner*—Duc Truong
*Attorney, Agent, or Firm*—Joy Alwan; Thomas Anderson; William R. Moser

[57] ABSTRACT

A method of encapsulating mixed waste in which a thermoplastic polymer having a melting temperature less than about 150° C. and sulfur and mixed waste are mixed at an elevated temperature not greater than about 200° C. and mixed for a time sufficient to intimately mix the constituents, and then cooled to a solid. The resulting solid is also disclosed.

11 Claims, No Drawings

PROCESS AND MATERIAL THAT ENCAPSULATES SOLID HAZARDOUS WASTE

CONTRACTUAL ORIGIN OF THE INVENTION

The United States Government has rights in this invention pursuant to Contract No. DE-AC07-76ID01570 between the U.S. Department of Energy (DOE) and EG&G Idaho Inc.

BACKGROUND OF THE INVENTION

This invention relates to the disposal of mixed waste which often includes metal oxides, lead and other metals. Mixed waste contains both chemically hazardous constituents, as defined by the Resource Conservation and Recovery Act of 1976 (RCRA), and low-level radioactive waste, as defined in the DOE Order 5820.2A (Sep. 26, 1988), Attachment 2 (May 11, 1988). Low-level waste means radioactive waste not classified as high-level waste, transuranic waste, or spent nuclear fuel as defined by the Order.

The scope of this document is limited to low-level radioactive waste which may not contain more than 100 nCi/gm of transuranic radionuclides (TRU). Wastes containing >100 nCi/gm are classified as TRU wastes and will be disposed of at the Waste Isolation Pilot Plant (WIPP). The 100 nCi/gmm limit applies to the final waste form. The treatment and disposal of mixed wastes must adhere, as a minimum, to the relevant provisions of the RCRA, the Atomic Energy Act of 1954, as amended, and state requirements, as mandated by the Federal Facilities Compliance Act of 1992 (FFCA).

Previously, sulfur polymer cement has been used for construction purposes and is made by reacting sulfur with dicyclopentadiene (DCP) and oligomers of cyclopentadiene (OCP). The problem with this material is that both DCP and OCP are very reactant and the attributes of their reaction products are sensitive to various processing variables. This results in batch to batch variation for sulfur polymer cement (SPC). Because SPC has demonstrated excellent resistance to salts and acids, it is a product which may be useful for the encapsulation for mixed wastes including low level toxic metal oxides and radioactive wastes.

The subject invention combines sulfur and the thermoplastic material having a melting temperature less than about 150° C. and low level radioactive wastes or toxic metal oxides to provide a solid material which has very good performance in the Toxicity Characteristics Leach Procedure Test (TCLPT). Compared to the DCP standard, the inventive material is only slightly less effective, on the order of about 25% but is significantly cheaper and provides repeatable results.

SUMMARY OF THE INVENTION

Accordingly, It is a principle object of the present invention to provide a method of encapsulating a low level of radioactive waste and toxic metal oxides using a combination of thermoplastic and sulfur materials.

Another object of the present invention is to provide a method of encapsulating radioactive waste material using a combination of sulfur and a polyolefin waste plastic.

Yet another object of the present invention is to provide a composition of matter including a thermoplastic material, sulfur and low level radioactive waste in which the radioactive waste may be present in amounts of about 40% by weight of the total material.

The invention consists of certain novel features hereinafter fully described and particularly pointed out in the appended claims, it being understood that various changes in the details may be made without departing from the spirit, or sacrificing any of the advantages of the present invention.

DETAILED DESCRIPTION OF THE INVENTION

Polyethylene sulfur (PES) cement is used as an example in this specification. It should be understood, however, that any scrap thermoplastic material which melts at 150° C. or less is suitable for the present invention. Representative materials which are acceptable are low density polyethylene (Idpe), high density polyethylene (hdpe), polypropylene, polystyrene and polyvinyl chloride. Many of the polyesters are not applicable simply because they have melting temperatures which are too high for the present invention. Because the toxic waste material involved in the encapsulation process of the present invention often includes metal oxides, the processing of the material must be conducted at a temperature below which the metal oxides, for instance lead or cadmium oxides, are vaporized. If the processing takes place at a temperature in excess of the vaporization temperature of the toxic metal oxides, then processing problems result. Accordingly, the limitation of the subject invention is to provide a process which can encapsulate a radioactive material at a processing temperature below the vaporization temperature of the lowest to vaporized metal oxide in the radioactive mixture.

The most common waste material available in the class of thermoplastics which is acceptable to the present invention is low density polyethylene. This material is cheap and in abundant supply and is the preferred material for use in the process because of its availability and cost. High quality sulfur is currently produced as a biproduct of several refining and $SO_x$ scrubbing operations in industry, particularly oil-refining. In late 1993, the price of sulfur dropped to nearly nothing and could be obtained for the cost of shipping. Elemental sulfur is not a useful structural material because of the destructive phase transformation from high temperature β-sulfur polymorph to the room temperature α-sulfur form, but mixing the sulfur with a suitable thermoplastic material prevents the residual stresses from building up between sulfur crystals which causes the elemental material to crack resulting in a significant loss of mechanical integrity.

Melting and mixing sulfur and the selected thermoplastic material, preferably a polyolefin and most preferably low density polyethylene, a structurally useful composite can be made which will accept a radioactive waste loading of up to about 40% by weight. While the phase transformation from β to α-sulfur still occurs during the cooling of the material, the polymer acts as a compliant layer between the sulfur crystals thereby avoiding the drawbacks of elemental sulfur.

It has been determined that the thermoplastic material should be present in an amount in the range of from about 2% by weight to about 10% by weight as a function of the amount of sulfur present. The sulfur should be present in an amount of about 90% to about 98% by weight as a function of the combination of sulfur and thermoplastic material. Because the purpose of the invention is to encapsulate radioactive waste material to form a solid product, the 40% loading factor is almost always used. That is for example, for 100 lbs. of sulfur used, 2 to 10 lbs. pounds of polymer are used and 44 lbs. of waste material could be absorbed into the mixture of 100 lbs. of sulfur and 10 lbs. polymer. Obviously, if less polymer is used then the 40% waste loading would result in fewer pounds of waste material in the composite. It is preferred that about 5% by weight of the thermoplastic material be present and that the three part material is heated to a temperature not greater than about 160° C. and stirred or otherwise agitated for a sufficient time intimately to mix the low level radioactive waste or toxic metal oxides with the sulfur and thermoplastic material, after which the mixed material is cooled to room temperature. The stirred mixtures can be processed at a temperature less than about 200° C. but the 160° C. is preferred. Liquid sulfur reaches its maximum viscosity at 180° C. and is more miscible with the partially melted polyethylene which forms nearly a homogenous mixture with rapid stirring. At this time solid waste like incinerator ash can be added to the stirred mixture. Also liquid waste can be added to the stirred mixture. The stirred combination of three constituents, that is the sulfur, the thermoplastic or polyethylene material and the radioactive waste or toxic metal oxides, it being understood that the radioactive waste or the toxic metal oxides can and will contain several components, are then cooled to approximately 130° C. where the viscosity lessens and the material is thereafter poured into molds forming the resultant composition of matter which acts as a storage vehicle for the low level radioactive waste and/or toxic metal oxides. The resultant solid appears to have fine elements of thermoplastic material woven throughout thereby providing an encapsulating material which has a good resistance to both acids and salts and is easier to process than either DCP or OCT, is cheaper and produces little or no gaseous biproducts. Moreover, the subject invention appears to have greater compatibility with a wider variety of waste materials and results in lower processing costs than either DCP or OCP.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of encapsulating mixed waste comprising mixing a thermoplastic polymer having a melting temperature less than about 150° C. and elemental sulfur and mixed waste at an elevated temperature not greater than about 200° C., mixing for a time sufficient to intimately mix the constituents, and thereafter cooling to a solid.

2. The method of claim 1, wherein the thermoplastic polymer includes a polyolefin.

3. The method of claim 1, wherein the thermoplastic polymer is principally low density polyethylene.

4. The method of claim 2, wherein the thermoplastic polymer is less than about 10% by weight of the sulfur present.

5. The method of claim 1, wherein the sulfur is present in the range of from about 90% to about 98% by weight of the combination of sulfur and thermoplastic resin.

6. The method of claim 4, wherein the constituents are heated to an elevated temperature about 160° C.

7. The method of claim 1, wherein the thermoplastic polymer is essentially polyethylene present in an amount about 5% by weight of the sulfur present, and mixed waste is present in the range up to about 40% by weight of the solid encapsulated waste.

8. A composition of matter, comprising a thermoplastic polymer having a melting temperature of less than about 150° C., elemental sulfur and mixed waste wherein the polymer is present in the range of from about 2% to about 10% by weight of the sulfur and the mixed waste is present up to about 40% by weight of the combination of sulfur and polymer.

9. The composition of matter of claim 8, wherein the thermoplastic polymer includes one or more of LDPE, HDPE, polystyrene, polypropylene and PVC.

10. The composition of matter of claim 9, wherein the thermoplastic polymer is principally LDPE.

11. The composition of matter of claim 10, wherein the thermoplastic polymer is present in the amount of about 5% by weight of the sulfur present.

* * * * *